April 9, 1929.	J. COMBER	1,708,358
TIRE REPAIR VULCANIZING APPARATUS
Filed Nov. 16, 1926	2 Sheets-Sheet 1
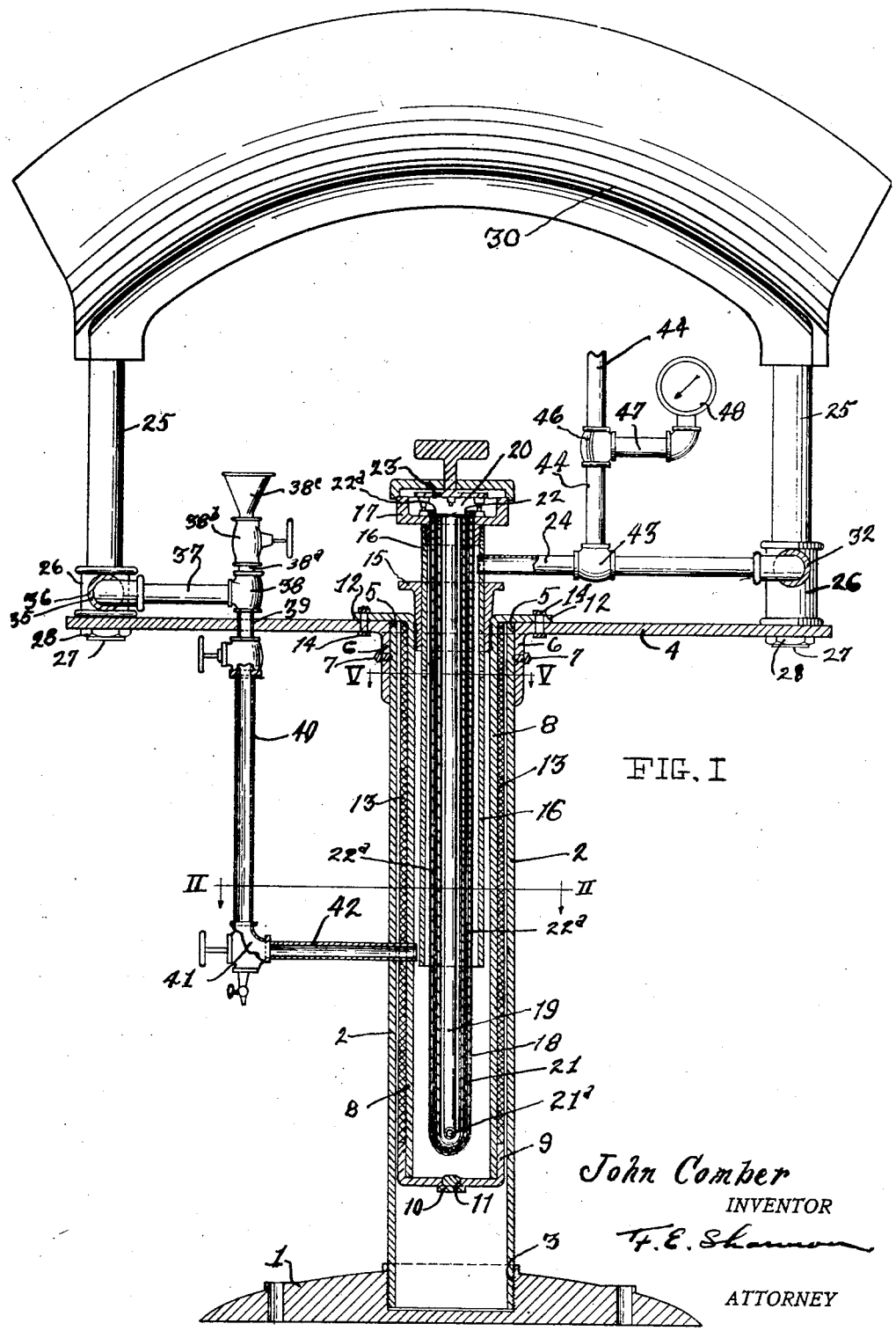

April 9, 1929.  J. COMBER  1,708,358
TIRE REPAIR VULCANIZING APPARATUS
Filed Nov. 16, 1926  2 Sheets-Sheet 2
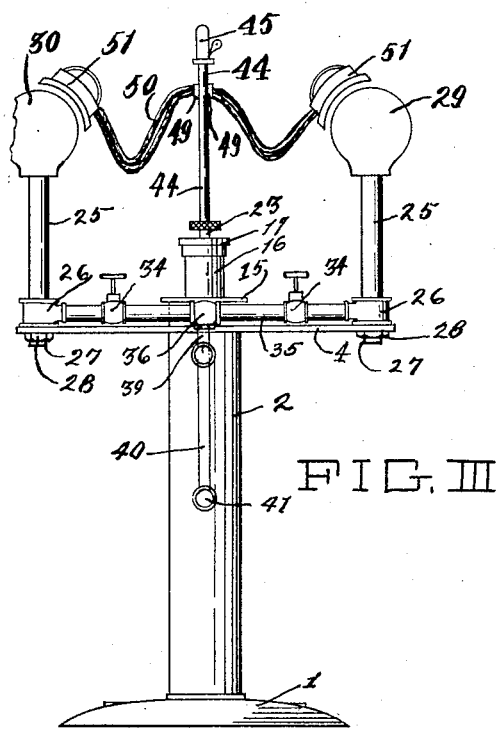
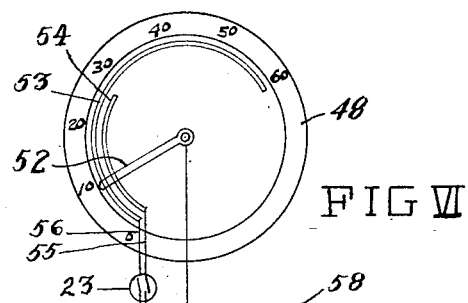
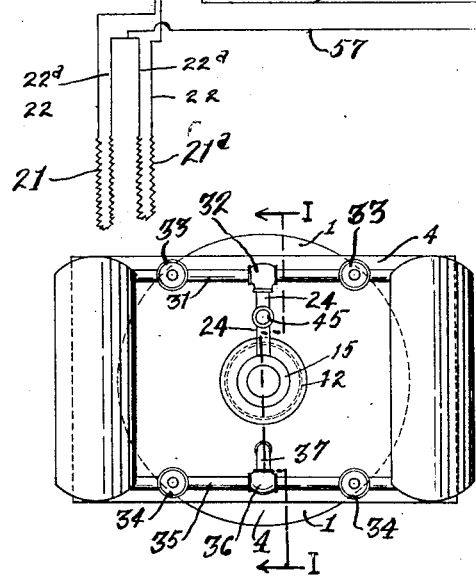
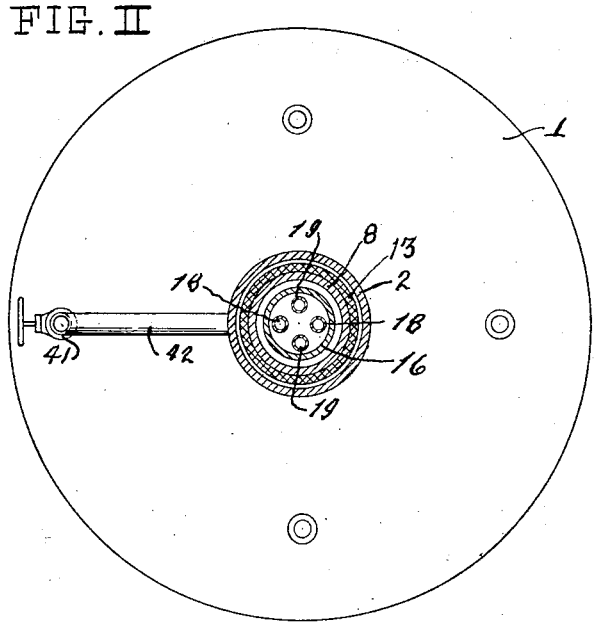
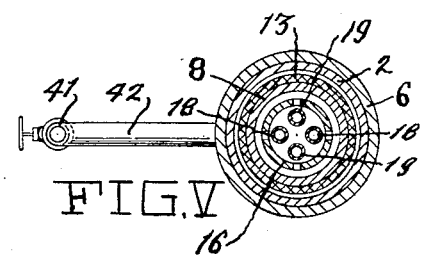
John Comber
INVENTOR
BY F. E. Shannon
ATTORNEY Patented Apr. 9, 1929.

1,708,358

UNITED STATES PATENT OFFICE.

JOHN COMBER, OF AKRON, OHIO, ASSIGNOR TO NATIONAL EQUIPMENT COMPANY, OF AKRON, OHIO.

TIRE-REPAIR VULCANIZING APPARATUS.

Application filed November 16, 1926. Serial No. 148,664.

This invention relates to new and novel improvements in vulcanizing apparatus for repairing pneumatic tire casings and has particular reference to improvements in tire repair vulcanizing devices in which steam is generated by electricity.

Objects of the invention, broadly stated, are to provide an electrically operated steam heated tire repair vulcanizing device of simple, durable construction which may be manufactured at a low cost and which will be rapid and economical in operation.

A particular object is to provide an electrically operated steam heated tire repair vulcanizing device which will produce steam and maintain the same at a vulcanizing temperature with a minimum expenditure of electrical energy.

A further object is to provide a tire vulcanizing stand having formed in the base thereof an electrically operated steam generating boiler whereby tire vulcanizing apparatus carried by the stand may be quickly and conveniently, economically heated and maintained at a vulcanizing temperature.

An additional object is to provide a highly efficient, combined vulcanizing stand and steam generator which will be neat and attractive in appearance and will occupy a minimum amount of space.

A still further object is to provide a combined vulcanizing stand and steam generator which is made up in great part of standard pipe fittings whereby the same may be constructed at a low cost and may be quickly and conveniently taken apart for replacement or repair.

Another object is to provide a tire vulcanizing stand having detachably secured therein an electrically operated steam generating boiler and to provide convenient means for detachably securing a heating element therein whereby the same may be quickly and conveniently removed and replaced when desired.

The above objects are accomplished and additional ends are attained by the novel construction, combination and arrangement of parts hereinafter described and illustrated in the accompanying drawing in which I have shown a preferred form of the invention, it being understood that the invention is capable of various adaptations and that changes and modifications may be made or resort had to substitutions which come within the scope of the invention as set forth in the appended claims.

In the drawings like characters of reference are used to designate like parts as the same may appear in any of the several views and in which:—

Figure I is a vertical, sectional view taken as indicated by the lines 1—1 of Figure IV.

Figure II is a horizontal, sectional view taken as indicated by the lines II—II of Figure I.

Figure III is a side elevational view of a tire repair vulcanizing stand constructed in accordance with this invention.

Figure IV is a top plan view of same.

Figure V is a horizontal, sectional view taken as indicated by the lines V—V of Figure 1.

Figure VI is a diagrammatic view of the electrical circuit employed in carrying out the invention.

Proceeding now to a detailed description of the invention with particular reference to the adaptations thereof disclosed in the drawings, the numeral 1 is used to designate a base plate and the numeral 2 is a hollow cylindrical up-right post. The post 2 is preferably composed of a straight length of standard steel pipe and is threaded or otherwise secured in a centrally arranged opening 3 in the base plate 1. The numeral 4 denotes a table which is suitably secured to the upper end of the post 2.

In the adaptation of the invention shown the table 4 is rectangular in form and is provided with a centrally positioned opening 5 which is adapted to receive the post 2. The table 4 is provided on the under side thereof with a cylindrical flange 6 which depends downwardly from the walls of said opening 5 to form a collar in which the upper end of the pipe is snugly received. While the collar 6 may be secured to the post 2 in any suitable manner, I have shown bolts 7 which are threaded in suitable bores in said collar 6 and entered in recesses which are formed in the exterior face of said post.

The numeral 8 denotes the main body of the steam boiler which is preferably formed of a section of pipe of smaller outside diameter than the interior diameter of the post 2. The pipe 8 is provided at the lower end thereof with a cap 9 which is threaded or otherwise suitably secured thereon. The cap 9 is provided with a threaded drain opening 11 in which is secured a screw plug 10. The pipe 8 is provided on the upper end thereof with an outwardly projecting, circumferentially extending flange 12. The pipe or boiler 8 is covered with a layer 13 of asbestos or other material which is a nonconductor of heat. The boiler 8 is inserted in the cavity of the post 2 so as to depend downwardly therein with the flange 12 positioned against the upper face of the table 4 and is secured thereto by means of the bolts 14 which are threaded in suitable bores which extend through the flange 12 and through the table 4. The boiler 8 is interiorly threaded at the upper end thereof and an exteriorly threaded screw plug 15 is operatively positioned therein. The plug 15 is likewise provided with a centrally positioned bore in which is received an upright pipe 16. The pipe 16 may be threaded, welded or otherwise suitably secured in the plug 15. The pipe 16 projects downwardly into the boiler 8 with the outer wall thereof in spaced relation to the inner wall of the boiler. The pipe 16 projects upwardly from the upper face of the plug 15 and is closed at the upper end thereof by means of an element supporting plug 17 which is threaded or otherwise suitably secured in the upper end thereof.

The numeral 18 denotes a U-shaped metal tube which has its free ends suitably secured in vertical bores formed in the plug 17. The tube 18 forms a loop having parallel members and extends downwardly through the tube 16 into the boiler 8 to a point in close spaced relation to the bottom thereof. A like U-shaped tube 19 is also attached in suitable bores in the plug 17 and likewise projects downwardly into the boiler 8. The tube 19 is substantially shorter than the tube 18 and is arranged with the axis of the loop at a right angle to the axis of the loop on the tube 18. The loop portion of the tube 19 is thus positioned between the members of the loop formed by the pipe 18 at a point adjacent the bottom thereof. The plug 17 is provided on the upper face thereof with a cavity 20 which normally communicates with the cavity of the tubes 18 and 19. A heating element 21 is positioned in each tube 18 so as to extend upwardly in each member of each loop in said pipe 18 at a point intermediate its length. A like heating element 21ᵃ is likewise mounted in the tube 19. The numeral 22 denotes conductor wires which are operatively attached to the one terminal of each heating element 21 and 21ᵃ and the characters 22ᵃ denote conductor wires attached to the other end of each terminal. Each of the wires 22 and 22ᵃ extend upwardly through the members of the tube 18 and 19 to the cavity 20. A three-way switch 23 is operatively secured on the upper face of the plug 17 whereby either or both of the elements in the tubes 18 and 19 may be operatively connected to a source of electrical energy as hereinafter described.

The pipe 16 is provided with a threaded bore which is formed in the wall thereof at a point between the upper face of the plug 15 and the lower face of the plug 17 and an outlet pipe 24 is operatively threaded therein. The table 4 is provided with a plurality of upright standards 25, one of which is secured to the table adjacent each corner thereof. Each standard 25 is tubular and the lower end thereof is threaded on a T-pipe coupling 26. The plug 27 is threaded in the downwardly presented opening in each T-coupling 26. Each plug 27 extends downwardly through a suitable bore in the table 4 and is secured to said table by means of a nut 28 which is threaded on the lower end of the plug 27 and operated to bear against the lower face of the table 4.

The numerals 29 and 30 denote curing arms, one of which is positioned on the upwardly projecting ends of each pair of standards 25. One of the standards 25 is secured to each end of each of the arms 29 and 30 with the bore of the standard 25 communicating with the cavity of the arm. The numeral 31 denotes a pipe which is operatively secured in the horizontal opening in the T-fitting 26, in which is fitted the standard 25 which leads to one end of one of said curing arms. The pipe 31 is also operatively secured in the T-member 26 which is secured to the standard 25 on the like end of the other arm 30. The pipe 24 is operatively connected to the pipe 31 by means of the T-coupling 32 whereby steam generated in the boiler 8 will be carried by the pipes 24 and 31 and through the standards 25 to the cavities of the curing arms 29 and 30. The pipe 31 is provided on each side of the T-coupling with the valves 33 and which may be operated to close the passage leading to each of said curing arms.

The numeral 35 denotes a pipe which operatively connects the T-coupling members 26 on the standard 25 which leads from the opposite ends of said arms. The pipe 35 is provided at a point intermediate its length with a T-coupling member 36 which is operatively interposed therein and a return pipe 37 is operatively attached to said coupling. A suitable valve 34 is interposed in the pipe 35 on each side of the coupling 36. A T-coupling 38 is secured to the other end of the pipe 37 and a pipe 39 is secured in said T-coupling so as to project downwardly a suitable opening in the table 4. A pipe 38ᵃ is secured in an upwardly presented opening of the T-coupling 38. A valve 38ᵇ is secured to the upper end of the pipe 38ᵃ and a filling tunnel 38ᶜ is secured to the upper end of the valve 38ᵇ. A water glass 40 is secured to the lower end of the pipe 39 and is provided on the lower end thereof with a suitable elbow fitting 41 in which the horizontal pipe 42 is secured. The pipe 42 is entered through the suitable opening in the wall of the post 2 and is threaded or otherwise secured in an opening in the wall of the boiler. It will be seen that the pipe 42 enters the boiler at a point below the normal water line in said boiler, so that water formed by the condensation of steam in each of the arms 29 and 30 will flow downwardly through the standards 25, the pipes 37 and 39, the water glass 40 and the pipe 42 to the boiler.

A T-coupling 43 is operatively interposed in the pipe line 24 and an upright pipe 44 is operatively secured therein. The pipe 44 projects upwardly to a point above the arms 29 and 30 and a blow off valve 45 is operatively secured to the upper end thereof. The pipe 44 is provided at a point intermediate its height with a T-coupling member 46 in which is operatively secured a pipe 47 which leads to a steam gauge 48. A pipe 44 is also provided at points adjacent the upper end thereof with outlet sockets 49 which are secured thereto and are operatively connected to a source of electrical energy. The sockets 49 are adapted to have conductor wires 50 plugged therein to provide electrical power for heating. The vulcanizing members 51 are arranged to contact with the exterior face of a tire positioned on the vulcanizing arms 29 and 30 for applying a vulcanizing heat to patches or repairs from the exterior face of the tire. The steam gauge 48 is provided with an indicating arm 52 which is arranged to contact with the arcuate strips 53 and 54. The arcuate strip 53 is connected by a conductor wire 56 to the conductor wire 22 which leads to one terminal of the heating element 21. The strip 54 is likewise connected by means of the wire 55 to the wire 22 leading to one terminal of the heating element 21ª. The other terminals 22ª of each filament 21 and 21ª are connected to a conductor wire 57 which leads to one pole of a source of electrical power. A conductor wire 58 leads from the other pole of said source of electrical power to the indicator arm 52.

It will be seen by reference to Figure VI that the two strips are secured to the gauge 48 in parallel spaced relation and that the indicator arm 52 is in contact with both of said strips when there is no pressure within the boiler and the free end of the arm 52 is positioned at 0. The strip 54 is substantially shorter than the strip 53 whereby the arm 52 will be moved out of contact with the strip 54 when pressure within the boiler has reached a certain predetermined point.

In use, the desired quantity of water is placed in the boiler 8 and the wires 57 and 58 are operatively connected to a source of electrical power. The switch 23 is operated to connect both of the wires 55 and 56 with the conductor wires 22. As there is no pressure within the boiler, the indicator arm is positioned at 0. At this point the arm is in contact with both of the strips 53 and 54 and each filament 21 and 21ª is thus operatively connected to a source of electrical power. Heat from the elements 21 and 21ª is transmitted through the walls of the tubes 18 and 19 to the water in the boiler. As the water becomes heated, steam is generated forming a pressure within the boiler; this moves the arm 52 upwardly in sliding contact with the strips 53 and 54. When a certain predetermined pressure is reached, the hand 52 is moved beyond the strip 54 thus breaking the circuit between the strip 54 and the arm 52, and breaking the electrical circuit in which the heating element 21 is interposed. As the circuit leading to the filament 31 is still closed, the boiler continues to generate steam and the arm 52 is moved forwardly along the strip 53 until the pressure within the boiler has reached a certain predetermined point which is preferably at or slightly above a vulcanizing temperature. As the arm 52 is moved to a higher point it moves out of contact with the strip 53 and breaks the electrical circuit in which the filament 21 is interposed. The strips 53 and 54 may extend over any desired sector of the gauge 48 and any number of filaments 21 and 21ª may likewise be connected to other strips similarly associated with said gauge 48. When it is desired to use only one of the arms 29 and 30, the valves 33 and 34 are operated to close the passages leading to one of said arms. It will be seen that the valves 33 and 34 may be operated to close the passage leading to both of said arms and that the plug 17 carrying the pipes 18 and 19 may be removed, repaired and replaced should it become necessary. It will also be seen that the pipes 24 and 42 may be quickly and conveniently removed and the boiler removed from the post 2.

Having thus illustrated my invention and described the same in detail, what I claim as new and desire to secure by Letters Patent is:—

1. In a tire repair vulcanizing stand, a hollow post, a supporting structure on the upper end of said post, said post projecting upwardly to the upper face of said supporting structure with the opening in the post accessible from the upper face of said supporting structure, a cylindrical boiler inserted in the cavity of said post; means to detachably secure said boiler to the supporting structure, a plurality of hollow vulcanizing arms mounted on said supporting structure, an outlet pipe leading from said boiler to each of said arms and a return pipe leading from each of said arms to said boiler, an electrically operated immersion heater detachably secured in one of the axial walls of said boiler and projecting longitudinally therein and valves in the pipes leading to and from each of said arms whereby each of the arms may be selectively heated.

2. In a tire repair vulcanizing stand, a hollow post, a supporting structure mounted on said post with the post projecting upwardly to the upper face thereof and with the opening in the post accessible from the upper face of said supporting structure, a cylindrical boiler inserted in said post means to detachably secure said boiler to the supporting structure, a hollow vulcanizing arm mounted on said supporting structure, an outlet pipe leading from said boiler to said arm and a return pipe leading from said arm to said boiler, an electrically operated immersion heater detachably secured in one of the axial walls of said boiler and projecting longitudinally therein, a steam gauge and means operated by said steam gauge for regulating said heater.

3. In a tire repair vulcanizing stand, a hollow cylindrical post, a supporting structure on the upper end of said post, said post provided with an open end, a cylindrical boiler inserted in said open end means to detachably secure said boiler in said post, a plurality of hollow vulcanizing arms mounted on said supporting structure, an outlet pipe leading from said boiler to each of said arms and a return pipe leading from each of said arms to said boiler, an electrically operated immersion heater detachably secured in said boiler and means to operatively connect said heater to a source of electrical power.

4. In a device of the class described, a base, a hollow post projecting upwardly therefrom, a supporting structure mounted in said post with the cavity of the post accessible from the upper face of said structure, a tubular boiler inserted in said post, means to detachably secure said boiler therein; an electrically operated immersion heating element detachably secured in the upper wall of said boiler and projecting downwardly therein, a hollow vulcanizing arm mounted on said supporting structure, a tube leading from the upper part of said boiler and operatively connected to said arm, a return tube leading from said arm to said boiler and means to operatively attach said heating element to a source of electrical power.

5. In a device of the class described, a tubular post, a table on said post, tubular standards projecting upwardly from said table, a hollow vulcanizing arm mounted on said standards with the bore of the standard in communication with the cavity of the arm, a cylindrical boiler detachably secured at the upper end of said post and projecting downwardly therein, a pipe secured in the upper end of said boiler, said pipe projecting downwardly therein in spaced relation to the wall thereof and projecting upwardly therefrom, said pipe provided at a point within the boiler and adjacent the upper end thereof with a plurality of openings, a plug detachably secured in the upper end of said pipe, heating elements secured to said plug and projecting through said pipe into said boiler, means to operatively connect said heating element with a source of electrical energy, a tube leading from the upper portion of said pipe, said tube operatively connected to one of said standards and a return tube leading from the other standard to said boiler.

6. In a device of the class described, a tubular post, a supporting structure on said post, tubular standards projecting upwardly from said structure, a hollow vulcanizing arm mounted on said standards with the bores of the standards in communication with the cavity of the arm, a boiler detachably secured in the cavity of said post, a pipe secured in the upper end of said boiler, said pipe projecting therein in spaced relation to the wall thereof and projecting axially therefrom, said pipe provided at a point within the boiler and adjacent the outer end thereof with a plurality of openings, a plug detachably secured in the upper end of said pipe, a plurality of heating elements secured to said plug and projecting through said pipe into said boiler, a steam gauge operatively connected to said boiler and means associated with said steam gauge to selectively connect said heating elements with a source of electrical energy, a tube leading from the upper portion of said pipe, said tube operatively connected to one of said standards and a return tube leading from the other standard of said boiler.

In testimony whereof I have hereunto set my hand.

JOHN COMBER.